(12) United States Patent
Temoshenko

(10) Patent No.: US 7,110,404 B1
(45) Date of Patent: Sep. 19, 2006

(54) SYSTEM AND METHOD FOR SENDING A PACKET TO MULTIPLE DESTINATIONS USING A PIPELINE NETWORK PROCESSOR

(75) Inventor: Leo Temoshenko, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 09/946,978

(22) Filed: Sep. 4, 2001

(51) Int. Cl.
*H04L 12/28* (2006.01)
*H04L 12/54* (2006.01)

(52) U.S. Cl. .................. 370/390; 370/432; 370/401; 370/389

(58) Field of Classification Search ............... 370/390, 370/389, 395.53, 409, 466, 381, 392, 401, 370/432; 709/238; 398/51
See application file for complete search history.

(56) References Cited

U.S. PATENT DOCUMENTS

| | | | | |
|---|---|---|---|---|
| 5,361,256 A | * | 11/1994 | Doeringer et al. | 370/390 |
| 5,898,686 A | * | 4/1999 | Virgile | 370/381 |
| 5,930,259 A | * | 7/1999 | Katsube et al. | 370/409 |
| 6,125,114 A | * | 9/2000 | Blanc et al. | 370/389 |
| 6,484,209 B1 | * | 11/2002 | Momirov | 709/238 |
| 6,493,345 B1 | * | 12/2002 | Margulis et al. | 370/395.53 |
| 6,515,994 B1 | | 2/2003 | Chuah et al. | |
| 6,542,503 B1 | | 4/2003 | Xu et al. | |
| 6,553,028 B1 | * | 4/2003 | Tang et al. | 370/389 |
| 6,654,371 B1 | * | 11/2003 | Dunstan et al. | 370/390 |
| 6,707,817 B1 | * | 3/2004 | Kadambi et al. | 370/390 |
| 6,735,201 B1 | | 5/2004 | Mahajan et al. | |
| 6,757,294 B1 | | 6/2004 | Maruyama | |
| 6,778,532 B1 | * | 8/2004 | Akahane et al. | 370/392 |
| 6,798,773 B1 | | 9/2004 | Trossen et al. | |
| 6,850,495 B1 | * | 2/2005 | Baum et al. | 370/256 |
| 6,850,707 B1 | * | 2/2005 | Chang et al. | 398/51 |
| 6,862,279 B1 | | 3/2005 | Imai et al. | |
| 6,870,842 B1 | * | 3/2005 | Caronni et al. | 370/390 |
| 6,870,843 B1 | | 3/2005 | Stewart | |
| 6,873,627 B1 | * | 3/2005 | Miller et al. | 370/466 |
| 2004/0095934 A1 | * | 5/2004 | Cheng et al. | 370/390 |

* cited by examiner

*Primary Examiner*—Ajit Patel
(74) *Attorney, Agent, or Firm*—Baker Botts L.L.P.

(57) ABSTRACT

In a pipeline network processor, a multicast echo feature ensures that a copy of a packet is sent to all downstream ports associated with an upstream port that delivers the packet. The pipeline network processor maintains a table of header information that is stripped away upon reception in order to forward the packet to each appropriate downstream port. The pipeline network processor performs direct lookups to identify downstream ports associated with the upstream port over which the packet is received. A direct lookup is also performed to obtain the necessary header with which to forward the packet. A copy of the packet with the correct header is then sent to each identified downstream port.

22 Claims, 3 Drawing Sheets

COLUMN-0 STRUCTURES
FEATURE DATA TABLE

| VCCI_IN | feature_flags | DS GROUP |
|---|---|---|
| 0 | ECHO ON | 0 |
| 1 | ECHO OFF | 0 |
| 2 | ECHO ON | 1 |
|  |  |  |

70

COLUMN-2 STRUCTURES
DS PORT GROUP TABLE

| GROUP | ib_channel | vcci_out | ds_port_num |
|---|---|---|---|
| 0 | 10 | 110 | 3 |
|  | 11 | 111 | 2 |
|  | 12 | 112 | 1 |
|  | ⋮ | ⋮ | ⋮ |
| 1 | 20 | 210 | 2 |
|  | 21 | 211 | 1 |
|  | ⋮ | ⋮ | ⋮ |
|  | ⋮ | ⋮ | ⋮ |

HASH TABLE

| | |
|---|---|
| 0 | 0 |
| 1 | 2 |
| 2 | 0 |
| 3 |  |

72

GROUP INFORMATION TABLE — COLUMN-5 STRUCTURES 75

| | MC ADDR | NEXT | JIB |
|---|---|---|---|
| 0 | 00000000 | 0000 | 0000 |
| 1 | E001227D | 0000 | 0001 |
| 2 | E000B44D | 0000 | 0002 |

NETWORK HEADER TABLE

| | NETWORK HEADER PART 1 TABLE | NETWORK HEADER PART 2 TABLE |
|---|---|---|
| 0 | 00 01 02 03 04 05 06 07 | 08 09 00 00 |
| 1 | 10 11 12 13 14 15 16 17 | 18 19 00 00 |
| 2 | 20 21 22 23 24 25 26 27 | 28 29 00 00 |

SYSTEM AND METHOD FOR SENDING A PACKET TO MULTIPLE DESTINATIONS USING A PIPELINE NETWORK PROCESSOR

TECHNICAL FIELD OF THE INVENTION

The present invention relates in general to information packet processing and more particularly to a system and method for sending a packet to multiple destinations using a pipeline network processor.

BACKGROUND OF THE INVENTION

Pipeline network processors are designed to forward Internet Protocol (IP) packets at an extremely high data rate in excess of two million packets per second. Pipeline network processors typically have a limited number of instruction cycles and memory to perform the applicable task. Implementing features or functions that do not fit the traditional packet forwarding model is a challenging endeavor and may have a negative impact on normal packet forwarding functions such as packet filtering and quality of service processing.

With respect to cable modem routers, one of the required and commonly used features is Multicast Echo. This feature enables cable media to behave like a standard shared media, as in Ethernet, in a local area network environment for Internet Protocol multicast traffic. Cable is a unidirectional media wherein packets are sent from customer premises equipment through a cable modem to an upstream port of a cable modem termination system. Packets are also sent from a downstream port of the cable modem termination system through the cable modem to the customer premises equipment. From a cable standpoint, the configured combination of one or more upstream ports and one or more downstream ports is known as a Media Access Control (MAC) Domain which is a cable media equivalent of a local area network segment.

In a local area network environment, a device is able to receive all multicast packets sent by other devices on the same segment. However in a cable environment, only half of the multicast processing has been completed when a multicast packet is received at an upstream port. The other customer premises equipment connected to the downstream port of the MAC Domain did not receive the multicast packet. Though other devices on the downstream port may be known to be present, normal multicast processing does not add the input interface to the list of output interfaces for multicast traffic and thus no relationship information among ports. This is intentionally done and required by the multicast protocol to avoid multicast traffic loops. The Multicast Echo feature overrides normal multicast processing and permits multicast packets to be forwarded to downstream ports of the MAC Domain.

When a high speed, high end cable modem termination system is developed using a pipeline network processor to forward packets between a large number, several hundred, of cable interfaces and a large number of trunk interfaces, implementing the Multicast Echo feature for the cable interfaces becomes extremely difficult. The cable line cards strip off the Data Over Cable (DOCSIS) header before passing the packet to the pipeline network processor. The pipeline network processor needs to add the original DOCSIS header to the multicast packet in order to forward the packet to one or more downstream ports. There needs to be support for tens of thousands of multicast groups, different service flows, and many MAC Domains. The amount of memory necessary to hold such large data structures and the processing cycles required to search them would preclude the use of a pipeline network processor in terms of cost and performance. A single multicast flow, which is less than 1% of the total traffic, could severely impact the processing of the other 99% of the traffic. Therefore, it is desirable to implement a Multicast Echo feature using a pipeline network processor despite its limited resources.

SUMMARY OF THE INVENTION

From the foregoing, it may be appreciated by those skilled in the art that a need has arisen for a Multicast Echo feature for cable interfaces in a pipeline network processor that does not require large amounts of memory or severely impacts packet forwarding performance. In accordance with the present invention, a system and method for sending a packet to multiple destinations using a pipeline network processor are provided which substantially eliminate or greatly reduce disadvantages and problems associated with conventional multicast packet processing.

According to an embodiment of the present invention, there is provided a method of sending a packet in a pipeline network processor to multiple destinations that includes receiving an information packet at an upstream port and determining whether the information packet has multiple destinations. If multiple destinations are involved, a group of downstream ports associated with the upstream port is identified for routing of the information packet. Forwarding information of a downstream port in the group of downstream ports is placed into the information packet. A copy of the information packet is forwarded to the downstream port and the next downstream port of the group is processed.

The present invention provides various technical advantages over conventional multicast packet processing. For example, one technical advantage is to provide multicast echo using the limited resources of a pipeline network processor without additional memory or unnecessary processing cycles. Another technical advantage is to provide minimal impact to normal packet forwarding features. Yet another technical advantage is to provide a multicast echo feature for similar and dissimilar inbound and outbound media. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 4A–B illustrates tables used in the pipeline network processor to enable multicast echo.

DETAILED DESCRIPTION OF THE INVENTION

Figure 1:
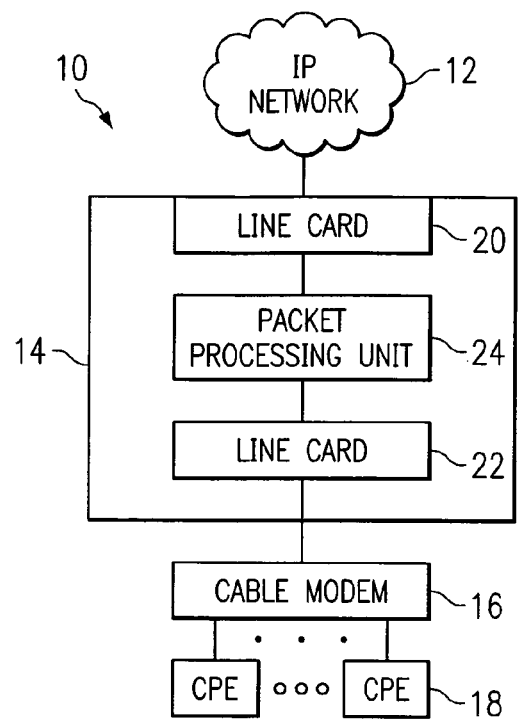
FIG. 1 illustrates a simplified block diagram of a packet processing and distribution network.

FIG. 1 is a simplified block diagram of a packet processing and distribution network 10. Network 10 includes an Internet Protocol network 12, a cable modem termination system 14, a cable modem unit 16, and a plurality of customer premises equipment 18. Cable modem termination system 14 includes a line card 20 to interface with Internet Protocol network 12, a line card 22 to interface with cable modem unit 16, and a packet processing unit 24.

Figure 2:
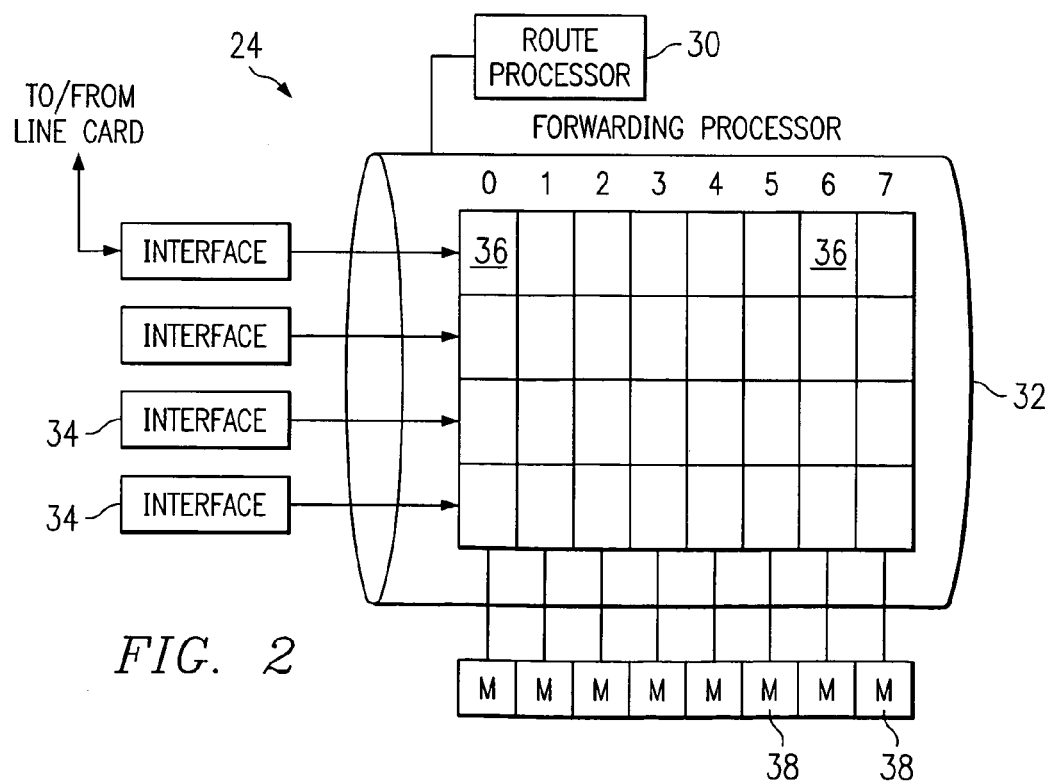
FIG. 2 illustrates a simplified block diagram of a pipeline network processor in the packet processing and distribution network.

FIG. 2 is a simplified block diagram of packet processing unit 24. Packet processing unit 24 includes a route processor 30, a forwarding processor 32, and a plurality of interface units 34. Interface units 34 receive and transmit packets from and to line cards 20. Route processor 30 performs initializing of forward processor 32 and setting/updating of feature and forwarding tables in forwarding processor 32. Route processor 30 may process certain packets diverted from forwarding processor 32. Route processor 30 may also inject packets into forwarding processor 32 for transfer to interface units 34 and line cards 20. Among other functions, injected packets may provide results for diverted packets and route updates. Forwarding processor 32 is a pipeline network processor that receives packets, performs fast path switching, feature enforcement, and packet forwarding.

Forwarding processor 32 includes eight processing columns 36. Each processing column 36 has 128 instruction cycles to perform packet processing before control is passed to the next processing column 36. If a processing column 36 does not complete its processing of a packet within the 128 instruction cycle, the packet is fed back to the processing column 36 for subsequent processing. Each processing column 36 includes a memory 38 to store tables used in the processing of a packet. Each memory 38 may be partitioned into a slow access memory and a fast access memory with varying amount of memory space.

Each processing column 36 performs a distinct processing function within forwarding processor 32. Column 0 performs initial identification and classification of a packet received from interface units 34. Column 1 performs a route lookup in order to properly forward the packet. Column 2 performs access control list processing to determine if the packet is allowed to be received and allowed to be forwarded. Column 3 performs input quality of service processing on the packet. Column 4 performs output quality of service processing on the packet and IP fragmentation if the packet length exceeds a desired output size. Column 5 performs MAC address rewriting. Column 6 performs output queuing of the packet. Column 7 performs output forwarding of the packet. For normal forwarding, a packet is identified and classified in Column 0 and a route for the packet is identified in Column 1. Input access control list processing is performed in Column 2 followed by input quality of service processing in Column 3. The packet returns to Column 2 for output access control list processing and is passed by Column 3 to Column 4 for output quality of service processing. Column 5 performs the MAC address rewrite and Column 6 places the packet in an output queue. Column 7 then forwards the packet towards its destination.

Forwarding processor 32 has a capability to perform a multicast echo feature. Whenever the multicast echo feature is enabled, Column 0 will send the inbound upstream multicast packet received at an upstream port from a line card 20 to a new echo path through Columns 1–7. This new echo path will forward, or echo, the received multicast packet to appropriate downstream ports associated with the upstream port and return the multicast packet to a normal multicast path in Column 1 on feedback. Ethernet MAC headers and Internet Protocol headers of the multicast packet are not altered during this process.

Figure 3:
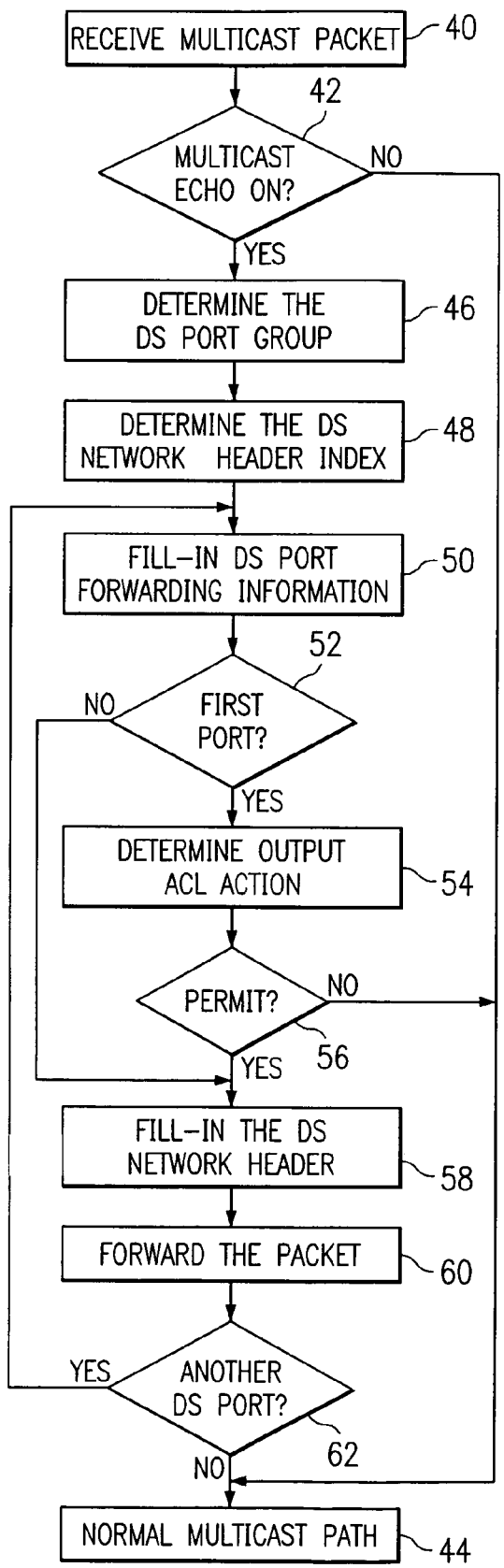
FIG. 3 illustrates a simplified logic flow diagram of multicast echo processing performed by the pipeline network processor.

FIG. 3 shows a logic flow for the multicast echo feature. Whenever a multicast packet is received at step 40, a determination is made at step 42 as to whether multicast echo is enabled for the inbound upstream port. If not enabled, the multicast packet is processed on a normal multicast processing path within forwarding processor 32 at step 44. If multicast echo is enabled, the multicast packet will enter multicast echo processing wherein a downstream port group associated with the upstream port is determined at step 46, a downstream DOCSIS or other network header is determined at step 48, and forwarding information for a downstream port in the downstream port group is filled into the multicast packet at step 50. At step 52, a determination is made as to whether this is the first downstream port being processed in the downstream port group. If so, output access control list processing is performed at step 54. A determination is made at step 56 as to whether to permit or deny access for multicast echo based on output access control list processing. If access is denied, the multicast packet is processed on a normal multicast processing path within forwarding processor 32 at step 44.

Process flow will proceed to step 58 upon either an indication that multicast echo is permitted or if this is not the first downstream port of the downstream port group being processed. The downstream network header is filled into the multicast packet and the multicast packet is forwarded to the downstream port at step 60. According to step 62, process flow will either proceed to the normal multicast processing path within forwarding processor 32 at step 44 upon processing the last downstream port of the downstream port group or return to step 50 to process the next downstream port of the downstream port group.

The multicast echo feature is driven by five main data structures in forwarding processor 32. These data structures are shown in FIGS. 4A–B and include a feature data table 70, a multicast echo hash table 72, a downstream port group table 74, a group information table 75, and a downstream network header table 76. These tables are created and updated by route processor 30 and determine the processing to be performed for the multicast echo feature. Feature data table 70 is in memory 38 of Column 0 and is indexed by an upstream port identifier. A flag indicates whether multicast echo is enabled for the upstream port. If enabled, feature data table 70 provides an index into downstream port group table 74. Downstream port group table 74 is in memory 38 of Column 2 and includes a group identifier, a bus channel indicator, a downstream port identifier, and a sequence number for each downstream port associated with the upstream port from which the multicast packet was received. Multicast echo hash table 72 is in memory 38 of Column 5 and is indexed by a cyclical redundancy check hash of the multicast address. Multicast echo hash table 72 provides an index into group information table 75. Group information table 75 has a list of entries including a multicast address, network header, and nest information group index used to obtain header information for packet transport from downstream network header table 76. Downstream network header table 76 is in memory 38 of Column 5 and contains a list of the unique downstream network header values for multicast echo processing.

The multicast echo feature may be implemented in forwarding processor 32 using detection processing, outbound lookup processing, outbound access control list processing, outbound forwarding processing and feedback/termination processing routines. The following tables show the operation of each routine for the multicast echo feature on a per processing column basis.

TABLE 1 shows the detection processing routine performed by forwarding processor 32 for the multicast echo feature. Detection processing is performed in Columns 0 and 1 and is initiated whenever a multicast packet is received.

TABLE 1

| Column | Detection Processing |
| --- | --- |
| 0 | Receive Multicast Packet from Cable Interface<br>If (Multicast-Echo Feature is ON for VCCI_IN)<br>    Save mce_ds_header_index in mac_rewrite_index field in Packet<br>    Save the offset to the DS Port Group Table entry in input_if_ip_addr in Packet<br>    PDONE (MC_ECHO)<br>Else<br>    PDONE (MULTICAST) |
| 1 | MC_ECHO Path<br>Pass Packet<br>PDONE (MC_ECHO) |

When column 0 receives a multicast packet, it will test for the multicast echo enable flag for the inbound upstream port in feature data table 70. If not enabled, Column 0 will forward the multicast packet to Column 1 along the normal multicast path. If multicast echo is enabled, Column 0 will copy the value of the downstream header index to a MAC rewrite index in the packet and store the offset to the downstream port group table entry into an input address field of the packet. Column 0 will then forward the multicast packet to Column 1 along a multicast echo path. Column 1 then passes the packet to Column 2 for outbound lookup processing.

TABLE 2 shows the outbound lookup processing routine performed by forwarding processor 32 for the multicast echo feature. Outbound lookup processing is performed in Column 2 and is initially triggered by the detection processing and subsequently by outbound access control list processing and/or outbound forwarding processing.

TABLE 2

| Column | Outbound Lookup Processing |
| --- | --- |
| 2 | MC_ECHO Path<br>Lookup the DS Port Entry<br>If (Feedback Stack is EMPTY)<br>    Lookup number of DS Ports in the DS Echo Group<br>    Build/Add Feedback Stack Entry<br>    Set the Feedback Type to SIMPLE<br>    Set the Packet Reference Count<br>    Turn MC_ECHO_RUN Bit to ON<br>    Set next_path to OUTPUT_ACL<br>Else<br>    Retrieve the Feedback Stack Entry<br>    Set next_path to MC_ECHO<br>    If (Feedback-Status equals OUTPUT_ACL_DENY)<br>        Turn MC_ECHO_RUN Bit to OFF<br>    Else<br>    If (Feedback-Status equals ?NETWORK_HEADER_FOUND)<br>        Set the Feedback Type to RESTORE<br>        Decrement the DS Port Index and save it in the Feedback Stack Entry<br>    Else<br>        Set the Feedback Type to SIMPLE<br>        Set next_path to MC_ECHO |

TABLE 2-continued

| Column | Outbound Lookup Processing |
| --- | --- |
| | If (MC_ECHO_RUN is ON) and (first pass or ENTRY-FORWARDED<br>    Decrement the DS Port Index and save it in the Feedback Stack Entry<br>    Fill-in the forwarding parameters<br>Else<br>    Reset the Packet Reference Count<br>    Clear vcci_in and mac_rewrite_index<br>PDONE (next_path) |

Column 2 will look up the forwarding parameters from the downstream port group table and place these parameters into the packet for later use by Columns 5–7 to forward the packet. Column 2 will then determine whether the feedback stack is empty. If the feedback stack is empty, Column 2 will perform initial feedback processing for the multicast echo feature. Column 2 will retrieve the number of downstream ports in the downstream port group table from the first entry in the downstream port group. A feedback entry is built and added to the feedback stack. The feedback stack entry is used to save the index of the next downstream port to process. a feedback type flag is set to SIMPLE to preserve forwarding parameters on the feedback pass to output access control list processing. On the first pass, the packet cannot be forwarded and restored on feedback. The first pass processing forces the packet through output access control list processing. A reference count for the packet is set to the number of downstream ports plus one to provide for feedback of the packet for the final pass to return the packet to the normal multicast processing path. A multicast run flag is set for the packet and the packet is forwarded for output access control list processing.

If the feedback stack is not empty, Column 2 will perform post feedback processing for the multicast echo feature. The feedback entry from the stack containing internal processing flags and the index of the next downstream port to process. The packet is then placed on the multicast echo path. Column 2 will then determine whether an output access control list denial has occurred. If so, the multicast run flag is cleared. After the multicast run flag is cleared or if there is no denial, a determination is made as to whether a downstream network header is found. If not found, the feedback type is set to SIMPLE and the packet is forwarded to outbound forwarding processing for further downstream network header lookup. If a downstream network header is found, the feedback type is set to RESTORE to preserve the original packet for subsequent forwarding along the multicast echo path or the normal multicast path. Column 2 will then decrement the downstream port index and save the new index to the feedback stack entry. If at this time the multicast run flag is set, Column 2 will fill the packet with the forwarding parameters from the downstream port group table for the current entry, decrement the downstream port index, and save the new index to the feedback stack entry. If the multicast run flag is cleared, the vcci_out and MAC rewrite index values are cleared and the packet reference count is reset. The packet is then forwarded on the next path.

TABLE 3 shows the outbound access control list processing performed by forwarding processor 32 for the multicast echo feature. Outbound access control list processing begins in Column 3 and is initiated by outbound lookup processing during the initial feedback processing of Column 2.

TABLE 3

| Column | Outbound ACL Processing |
| --- | --- |
| 3-4 | OUTPUT_ACL Path<br>Pass Packet<br>PDONE (OUTPUT_ACL) |
| 5 | OUTPUT_ACL Path<br>If (MC_ECHO_RUN bit is on)<br>    Perform Downstream Network Header lookup<br>PDONE (OUTPUT_ACL) |
| 6-0 | OUTPUT_ACL Path<br>Pass Packet<br>PDONE (OUTPUT_ACL) |
| 1 | OUTPUT_ACL Path<br>If (MC_ECHO_RUN Bit is ON)<br>    If (Feedback-Status equals BUFFER_ALLOC_FAIL)<br>        Pop Feedback Stack<br>        PDONE (BYPASS)<br>    Else<br>        PDONE (OUTPUT_ACL)<br>Else<br>    PDONE (OUTPUT_ACL) |
| 2 | OUTPUT_ACL Path<br>Process Output ACL<br>If (Permit)<br>    If (MC_ECHO_RUN Bit is ON)<br>        PDONE (MC_ECHO)<br>    Else<br>        PDONE (OUTPUT_QOS)<br>If (Deny or Error)<br>    PDONE (DROP) |
| 3 | DROP Path<br>Pass Packet<br>PDONE (DROP) |
| 4 | DROP PATH<br>If (MULTICAST Packet)<br>    IF (MC_ECHO_RUN Bit is ON)<br>        Set ACL-State in the Feedback Stack Entry to<br>            ACL_DROP<br>        PDONE (MC_ECHO)<br>    Else<br>        PDONE (MULTICAST)<br>Else<br>    PDONE (DROP) |

In outbound access control list processing, the packet is passed through Columns 3–4 to Column 5 where an attempt is made to find the downstream network header based on the multicast address in the packet. The multicast address is hashed with the result being an index to multicast echo hash table 72. The index of the first multicast echo group information entry is retrieved from multicast echo hash table 72 and is used in group information table 75. The multicast address in group information table 75 is compared to the multicast address in the packet. If the addresses match and there are no more entries in the table, the downstream network header index is stored in the packet and NETWORK_HEADER_FOUND is set. If there is no match and there are more entries, the next entry is retrieved and compared. The packet is then passed to Column 6, fed back to Column 0 from Column 7, and forwarded to Column 1. Column 7 will move the original packet from internal packet memory to external random access memory. Column 1 determines whether multicast echo processing is underway by checking the multicast run flag. If the multicast run flag is not set, the packet is forwarded to Column 2 along the output access control list processing path If the multicast echo feature is being processed, a determination is made as to whether a buffer allocation failure has occurred. a buffer allocation failure may occur on the first feedback pass and indicate that the original packet did not move from internal packet memory to external random access memory. If a buffer allocation failure occurred, Column 1 will forward the packet on a bypass path to Column 2 for fatal error processing.

If there is no buffer allocation failure, Column 1 forwards the packet to column 2 for output access control list processing. Column 2 determines whether or not configured access control lists will allow the packet to be forwarded to the downstream port. If access is permitted, Column 2 will forward the packet on the multicast echo path to Column 3 if the multicast run flag is set. Otherwise the packet is forwarded to Column 3 on the output quality of service path for appropriate forwarding processing. If access is denied, Column 2 forwards the packet to Column 4 through Column 3 along a drop path. Column 4 will forward a unicast packet on the drop path for drop forwarding. If multicast echo processing is underway, an access control list state in the feedback stack entry is set to DROP and the packet is forwarded on the multicast echo path. If the multicast run flag is not set, the packet is forwarded on the normal multicast path.

TABLE 4 shows outbound forwarding processing performed by forwarding processor 32 for the multicast echo feature. Outbound forwarding processing begins in Column 3 and is initiated by either outbound lookup processing or outbound access control list processing in Column 2.

TABLE 4

| Column | Outbound Forwarding Processing |
| --- | --- |
| 3-4 | MC_ECHO Path<br>Path Packet<br>PDONE (MC_ECHO) |
| 5 | MC_ECHO Path<br>If (MC_ECHO_RUN is ON)<br>    If (NETWORK_HEADER_FOUND is set)<br>        Rewrite Network Header<br>        PDONE (BUFFER_MGMT)<br>    Else<br>        Perform Downstream Network Header Lookup<br>Else<br>    PDONE (MC_ECHO) |
| 6 | BUFFER_MGMT Path<br>Common Forwarding Processing<br>PDONE (ENQUEUE)<br>MC_ECHO Path<br>Pass Packet<br>PDONE (MC_ECHO) |
| 7 | ENQUEUE Path<br>Copy of Packet Sent to DS Port<br>MC_ECHO Path and ENQUEUE Path<br>Packet Feedback to Column 0 on MC_ECHO Path |

The packet is passed to Column 5 through Columns 3 and 4 on the multicast echo path. Column 5 determines whether outbound forwarding is to be performed. Column 5 checks feedback flags to determine whether the packet passed output access control list processing. If not, the packet is to be dropped and forwarded accordingly through Columns 6 and 7 for appropriate feedback processing. Also, the packet will be forwarded on the multicast echo path through Columns 6 and 7 for appropriate feedback processing if the multicast run flag is not set, indicating that the packet is making a termination pass.

If outbound forwarding is to be performed, Column 5 determines whether a downstream network header has been found. If so, Column 5 will rewrite the downstream network header value and forward the packet to Column 6 on a buffer management path. Column 6 will perform normal buffer management processing and pass the packet to Column 7 on an enqueue path. Column 7 forwards the packet to the identified downstream port and feeds the packet back to Column 0 on the multicast echo path for processing of the next downstream port. If a downstream network header has not been found, Column 5 will perform a downstream network header lookup based on the multicast address of the packet and then forward the packet on the multicast echo path.

TABLE 5 shows the feedback/termination processing routine performed by forwarding processor 32 for the multicast echo feature. Feedback/termination processing is performed in Column 0 and is initially triggered upon feedback of a packet.

TABLE 5

| Column | Feedback Processing |
|---|---|
| 0 | MC_ECHO Path |
| | If (MC_ECHO_RUN is ON) |
| |    Calculate the offset to the next DS Port entry and save it in input_ip_if_addr |
| |    PDONE (MC_ECHO) |
| | Else |
| |    Feedback Cleanup |
| |    Restore Packet for Normal Multicast Processing |
| |    PDONE (MULTICAST) |
| 1 | MFIB Path |
| |    Normal Multicast Processing |
| | MC_ECHO Path |
| |    Pass Packet |
| |    PDONE (MC_ECHO) |
| | OUTPUT_ACL Path |
| |    SEE Outbound ACL Processing |

Upon receiving a packet on the multicast echo path, Column 0 determines whether the multicast echo feature is enabled. If so, Column 0 calculates the offset for the next downstream port group table entry into the input address field of the packet. The packet is then forwarded to Column 1 on the multicast echo path to initiate outbound lookup processing. If the multicast run flag is not set, Column 0 performs feedback cleanup by removing the feedback stack entry from the feedback stack. The value in the input address field of the packet is reset for normal multicast processing. The packet is then forwarded to Column 1 on the normal multicast path for normal multicast processing.

As discussed above, when a multicast packet is received from an upstream port, forwarding processor 32 performs a direct lookup in the downstream port group table to determine the downstream ports associated with the upstream port. Forwarding processor 32 also performs a direct lookup into the MAC Domain according to a service flow of the upstream port to determine the downstream multicast DOCSIS header information associated with the packet. Forwarding processor then sends a copy of the packet to each appropriate downstream port in the group with a correct DOCSIS header. Forwarding processor 32 builds a downstream multicast DOCSIS header table including default and known/learned DOCSIS header information associated with multicast packets. A MAC Domain table is also built to associate service flows from upstream ports to either the default or known/learned DOCSIS header information. The relationship between a service flow from an upstream port and to a downstream multicast DOCSIS header is a many to one relationship. Other fields in the table are used for inbound MAC header classification in order to determine the format of a received packet. The downstream port group table includes a list of the downstream ports for each MAC Domain. The relationship between an upstream port and a downstream port group is also a many to one relationship.

The multicast echo feature within forwarding processor 32 uses single pass processing and permits any combination of upstream ports, upstream flows, and multicast groups. Upstream information is used to find appropriate downstream information. Similar and dissimilar inbound and outbound media may be accommodated. No restructuring of the pipeline network processing capability of forwarding processor 32 is needed, no additional memory is required, and normal multicast packet forwarding is not affected. In a cable modem environment, the multicast echo feature enables the cable media to behave like a standard shared media in a local area network environment.

Thus, it is apparent that there has been provided, in accordance with the present invention, a system and method for sending a packet to multiple destinations using a pipeline network processor that satisfies the advantages set forth above. Although the present invention has been described in detail, it should be understood that various changes, substitutions, and alterations may be made herein. For example, though discussed in relation to a cable modem environment, the present invention may equally apply in other packet distribution environments that use a pipeline network processor. Other examples may be readily ascertainable by those skilled in the art and may be made herein without departing from the spirit and scope of the present invention as defined by the following claims.

What is claimed is:

1. A method for sending a packet to multiple destinations using a pipeline network processor, comprising:
   receiving an information packet from a cable modem at an upstream port;
   determining whether the information packet has multiple destinations;
   identifying a group of downstream ports associated with the upstream port for routing of the information packet in response to the information packet having multiple destinations;
   placing forwarding information of a particular downstream port in the group of downstream ports into the information packet;
   forwarding a copy of the information packet to the particular downstream port.

2. The method of claim 1, further comprising:
   determining whether the particular downstream port associated with the forwarding information placed into the information packet is a first downstream port of the group of downstream ports being processed.

3. The method of claim 2, further comprising:
   performing output access control list processing on the information packet in response to the particular downstream port being the first downstream port processed in the group of downstream ports.

4. The method of claim 3, further comprising:
   determining whether the information packet has access to the particular downstream port in response to the output access control list processing.

5. The method of claim 4, further comprising:
   dropping the information packet in response to the information packet not having access to the particular downstream port.

6. The method of claim 1, further comprising:
   determining a next downstream port to be processed of the group of downstream ports;
   saving an identity of the next downstream port pending processing of the downstream port.

7. The method of claim 6, further comprising:
   completing the downstream port processing;

placing forwarding information of the next downstream port in the group of downstream ports into the information packet.

8. The method of claim 1, further comprising:
identifying header information for the information packet, the header information operable to assist in forwarding the information packet to each downstream port.

9. The method of claim 8, wherein the header information is identified by comparing a multicast address of the information packet to a reference multicast address.

10. The method of claim 9, further comprising:
providing header information associated with the reference multicast address upon being matched with the multicast address of the information packet.

11. A pipeline network processor including code for sending a packet to multiple destinations, the code operable to:
classify an information packet received from a cable modem;
determine whether an inbound port from which the packet is received has been identified for multicast echoing of the information packet;
save a header index and a downstream port group entry associated with the upstream port in response to the upstream port being enabled for multicast echo processing;
identify a downstream port associated with the upstream port in response to the downstream port group entry;
insert forwarding parameters for the downstream port into the information packet;
determine whether the information packet is permitted access to the downstream port;
associate a header with the information packet in response to the information packet being permitted access to the downstream port;
forward a copy of the information packet to the downstream port;
feedback the information packet to process the next downstream port associated with the downstream port group entry.

12. The pipeline network processor of claim 11, wherein access processing performed in a feedback path.

13. The pipeline network processor of claim 11, the code further operable to:
drop the information packet in response to the information packet not having access to the downstream port.

14. The pipeline network processor of claim 11, wherein a multicast address of the packet is compared to reference multicast addresses in order to identify the header for the information packet.

15. A system for sending a packet to multiple destinations, comprising:
an upstream packet interface operable to receive an information packet from a cable modem at an upstream port;
a pipeline network processor operable to forward the information packet to multiple destinations, the pipeline network processor including a plurality of processing columns operable to determine the multiple destinations for the information packet, the plurality of processing columns operable to determine whether the upstream port is enabled for multicast echo processing, the plurality of processing columns operable to identify a group of downstream ports associated with the upstream port in response to multicast echo being enabled, the plurality of processing columns operable to build a copy of the information packet with appropriate header information in order to route the copy of the information packet to each downstream port associated with the upstream port;
a route processor operable to configure the pipeline processor for multicast echo processing.

16. The system of claim 15, wherein the pipeline network processor compares a multicast address of the information packet to one or more reference multicast addresses in order to identify the header information for the packet.

17. The system of claim 15, further comprising:
a downstream packet interface operable to provide the information packet to a downstream destination.

18. The system of claim 17, wherein the downstream packet interface couples to the cable modem.

19. The system of claim 15, wherein the pipeline network processor performs one or more feedback loops through its plurality of processing columns in order to send copies of the information packet to each downstream port associated with the upstream port.

20. A system for sending a packet to multiple destinations using a pipeline network processor, comprising:
means for receiving an information packet from a cable modem at an upstream port;
means for determining whether the information packet has multiple destinations;
means for identifying a group of downstream ports associated with the upstream port for routing of the information packet in response to the information packet having multiple destinations;
means for placing forwarding information of a particular downstream port in the group of downstream ports into the information packet;
means for forwarding a copy of the information packet to the particular downstream port.

21. The system of claim 20, further comprising:
means for associating header information for a particular downstream port with the information packet.

22. The system of claim 21, further comprising:
means for comparing a multicast address of the information packet to a reference multicast address in order to identify the header information.

* * * * *